3,591,591
Patented July 6, 1971

3,591,591
BISMUTH SALT OF 6-METHYL-8-
HYDROXYQUINOLINE
Eugene Riviere, Issy-les-Moulineaux, Danyele Yvette
Vilarel, Chantilly, and Roger Lucien Debrie, Brenouille,
France, assignors to Ugine Kuhlmann, Paris, France
No Drawing. Filed Nov. 29, 1968, Ser. No. 780,206
Claims priority, application France, Dec. 1, 1967,
130,566
Int. Cl. C07d 33/44
U.S. Cl. 260—270                                1 Claim

ABSTRACT OF THE DISCLOSURE

The compounds of the formula:

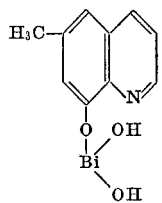

The compound is useful for the treatment of diarrhoea.

---

The present invention relates to a new anti-diarrhoeic and antiparasitic medicament comprising 6-methyl-8-bismuthohydroxy-quinoline of the following formula:

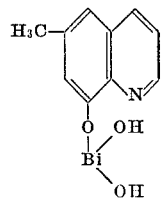

This new compound may be prepared, for example, in the following way:

25 parts of crystalline bismuth nitrate are dissolved in 20 parts by volume of distilled water containing 4 parts by volume of 40° Bé. nitric acid; 8 parts of freshly distilled 6-methyl-8-hydroxy-quinoline are dissolved in a mixture of 100 parts by volume of distilled water containing 1.5 parts by volume of 66° Bé. sulphuric acid; the solution is diluted with 100 parts by volume of distilled water. The second solution is added to the first and the mixture is neutralised by the addition of a 10% solution of sodium carbonate, i.e. about 130 parts by volume, and is brought to the boil and the pH is checked. This must be about 7. The precipitate is filtered off, washed until the nitrate is eliminated and dried. 20 parts of a golden yellow powder are obtained, which is insoluble in water, alcohol, fats and weak alkaline solutions. It dissolves in strong acid solutions giving a yellow coloration.

Molecular weight=401

*Analysis.*—Calculated (percent): C, 29.92; H, 2.49; N, 3.50; Bi, 52.11; methyl hydroxyquinoline, 39.65. Found (percent): C, 29,23; H, 2.50; N, 3.8; Bi, 52.8; methyl hydroxyquinoline, 39.6.

The methyl hydroxyquinoline is characterised by its melting point: 95–96° C. (Maquenne block).

TOXICOLOGICAL PROPERTIES

With Charles River C D 1 albino mice and Sprague Dawley rats, taken per os, the product is atoxic, since the LD 50 is over 10,000 mg./kg. No particular symptomatology is recorded.

When examined for chronic toxicity, at a dose of 200 and 1000 mg./kg. for 2 months, 6-methyl-8-bismutho-hydroxyquinoline did not induce any modification of the animals behaviour, which remained normal and comparable to that of control animals.

In the same way, the growth in weight of the little rats treated is quite parallel to that of the control animals.

The macroscopic examination of the principal organs of the treated rats and of the control animals showed the excellent tolerance of 6-methyl-8-bismuthohydroxy-quinoline at a dose of 200 mg./kg. taken per os. Its gastro-intestinal tolerance remains remarkable.

BACTERIOSTATIC PROPERTIES

The bacteriostatic activities have been determined on different bacterial species:

Gram positive cocci:
  Staphylococcus aureus Oxford strain,
  Streptococcus faecalis, ATCC 9790 strain (Enterococcus)
Gram negative bacilli:
  Escherichia coli, 416 Lausanne strain
  Proteus vulgaris, C.E.S. strain
  Klebsiella pneumoniae, 444 Lausanne strain (Phenumobacillus)
  Pseudomonas aeruginosa, 414 Lausanne strain (B. pyocyanic)

6-methyl-8-bismuthohydroxy-quinoline is suspended in a mixture of equal parts of distilled water and propylene glycol. The culture medium is prepared from a peptonised medium treated with salt and gelose and having the following composition:

|  | G. |
|---|---|
| Meat extract | 5 |
| Peptone | 10 |
| Sodium chloride | 5 |
| Gelose | 20 |
| Distilled water, pH 7.2 | 1000 |

After liquefaction on a water-bath and cooling to 40–50° C. this medium is run into Petri dishes containing the suspension of the product to be examined and vigorously agitated so as to distribute the few insoluble grains of the latter as regularly as possible in the gelose medium. The bacterial strains are transplanted the day before the test is salted peptonised broth (without gelose). After 24 hours in the incubator at 37° C. the medium run into Petri dishes is inoculated in grooves on the surface and the dishes are put in the incubator at 37° C. A control dish receives 2 mls. of a mixture of water and propylene glycol in order to test the inactivity. The tests made in duplicate comprise two series of dilution.

The results obtained with the bismuth salt of 6-methyl-8-hydroxyquinoline are indicated in the following table:

|  | Bacteriostatic concentrations expressed in mcg./ml. |
|---|---|
| Staphylococcus | 5 |
| E. coli | 50 |
| Interococcus | 10 |
| Pneumobacillus | 25 |
| Proteus | 25 |

These results show a high bacteriostatic power.

THERAPEUTIC APPLICATIONS

The data for 6-methyl-8-bismutho-hydroxyquinoline relate to all forms of diarrhoea of adults and children, whether they are microbial, parasitic or following on antibiotherapy, intestinal parasite and oxyuris infection or infection with colon bacillus.

The product may be administered in powdered, granulated, or in compressed lozenge form containing 250 mgs. or 500 mgs. at the rate of:

For nursing infants: 250 mg./day
For children from 1 to 2 years: 500 to 700 mg./day
For children over 2 years: 750 mg./day
For adults: 1 to 2 g./day

We claim:
1. The compound of the formula:

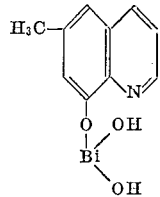

References Cited
UNITED STATES PATENTS

| 1,129,865 | 3/1915 | Hahl | 260—270 |
| 1,485,380 | 3/1924 | Engels | 260—270 |
| 3,019,256 | 1/1962 | Dunn | 252—431X |
| 3,287,456 | 11/1966 | Brossi | 260—270 |

OTHER REFERENCES

Gaucher, Abst. in Chem. Abstr., Vol. 28, col. 1813 (1934).

DONALD G. DAUS, Primary Examiner

U.S. Cl. X.R.
260—289; 424—245